(12) United States Patent
Suzuki (10) Patent No.: US 7,012,399 B2
(45) Date of Patent: Mar. 14, 2006

(54) POSITION DETECTOR CORRECTION METHOD AND ELECTRICALLY-POWERED STEERING APPARATUS

(75) Inventor: Hiroshi Suzuki, Kariya (JP)

(73) Assignee: Toyoda Machine Works, Ltd., Kariya (JP)

( * ) Notice: Subject to any disclaimer, the term of this patent is extended or adjusted under 35 U.S.C. 154(b) by 15 days.

(21) Appl. No.: 10/307,994

(22) Filed: Dec. 3, 2002

(65) Prior Publication Data

US 2003/0111974 A1  Jun. 19, 2003

(30) Foreign Application Priority Data

Dec. 4, 2001   (JP) ........................................ 2001-369596

(51) Int. Cl.
  *G05B 1/06* (2006.01)

(52) U.S. Cl. ........................ 318/661; 318/605; 341/116

(58) Field of Classification Search ......... 318/652–655, 318/569, 573, 254, 700–701, 727, 661, 632, 318/560, 606–611, 638, 58; 702/163, 189; 341/116–117

See application file for complete search history.

(56) References Cited

U.S. PATENT DOCUMENTS

| | | | | |
|---|---|---|---|---|
| 4,282,468 A | * | 8/1981 | Barker et al. ................. 318/608 |
| 4,352,050 A | * | 9/1982 | Sakano ......................... 318/661 |
| 4,370,642 A | * | 1/1983 | Costello et al. .............. 341/117 |
| 4,468,745 A | * | 8/1984 | Kjosavik ...................... 702/151 |
| 4,668,745 A | * | 5/1987 | Hefner, Jr. ................... 525/531 |
| 4,740,778 A | | 4/1988 | Harding et al. |
| 4,864,284 A | | 9/1989 | Crayton et al. |
| 5,134,404 A | * | 7/1992 | Peterson ...................... 341/116 |
| 5,637,998 A | * | 6/1997 | Kushihara ................. 324/207.25 |
| 5,646,496 A | * | 7/1997 | Woodland et al. ........... 318/632 |
| 5,760,562 A | * | 6/1998 | Woodland et al. ........... 318/632 |
| 5,783,925 A | * | 7/1998 | Umemura et al. ........... 318/661 |
| 5,796,231 A | * | 8/1998 | Kyodo ......................... 318/608 |
| 5,868,296 A | * | 2/1999 | Gentile et al. ................. 226/35 |
| 5,949,359 A | * | 9/1999 | Vlahu ........................... 341/116 |
| 6,084,376 A | * | 7/2000 | Piedl et al. ................... 318/605 |
| 6,191,550 B1 | * | 2/2001 | Yoshihara .................... 318/661 |
| 6,278,388 B1 | * | 8/2001 | Kushihara .................... 341/112 |
| 6,389,373 B1 | * | 5/2002 | Ohya ........................... 702/189 |
| 6,427,104 B1 | * | 7/2002 | Matsushita et al. ........... 701/41 |
| 6,577,957 B1 | * | 6/2003 | Fujimoto et al. .............. 702/36 |
| 2002/0143450 A1 | | 10/2002 | Fujimoto et al. |

FOREIGN PATENT DOCUMENTS

| | | |
|---|---|---|
| EP | 0 795 738 | 9/1997 |
| EP | 978947 A2 * | 2/2000 |

OTHER PUBLICATIONS

Patent Abstracts of Japan, JP 09–257410, Oct. 3, 1997.

* cited by examiner

*Primary Examiner*—David Martin
*Assistant Examiner*—Renata McCloud
(74) *Attorney, Agent, or Firm*—Oblon, Spivak, McClelland, Maier & Neustadt, P.C.

(57) ABSTRACT

This invention provides an electrically-powered steering apparatus capable of assisting a steering torque appropriately using a resolver. A reference signal is applied to a resolver arithmetic processing I/F circuit 34 and a resolver arithmetic processing I/F circuit 36 through a reference signal input means 38 and a microcomputer 30 obtains a differential in amplification factor from outputs of the resolver arithmetic processing I/F circuit 34 and the resolver arithmetic processing I/F circuit 36 when the reference signal is supplied. A correction value for computing a position from the outputs of the resolver arithmetic processing I/F circuit 34 and the resolver arithmetic processing I/F circuit 36 is computed from the obtained differential.

5 Claims, 10 Drawing Sheets

POSITION DETECTOR CORRECTION METHOD AND ELECTRICALLY-POWERED STEERING APPARATUS

BACKGROUND OF THE INVENTION

1. Field of the Invention

The present invention relates to a correction method of a position detector using a resolver and an electrically-powered steering apparatus for assisting steering of vehicle wheels based on a motor position detected by the position detector or a steering torque.

2. Description of Related Art

Figure 10:
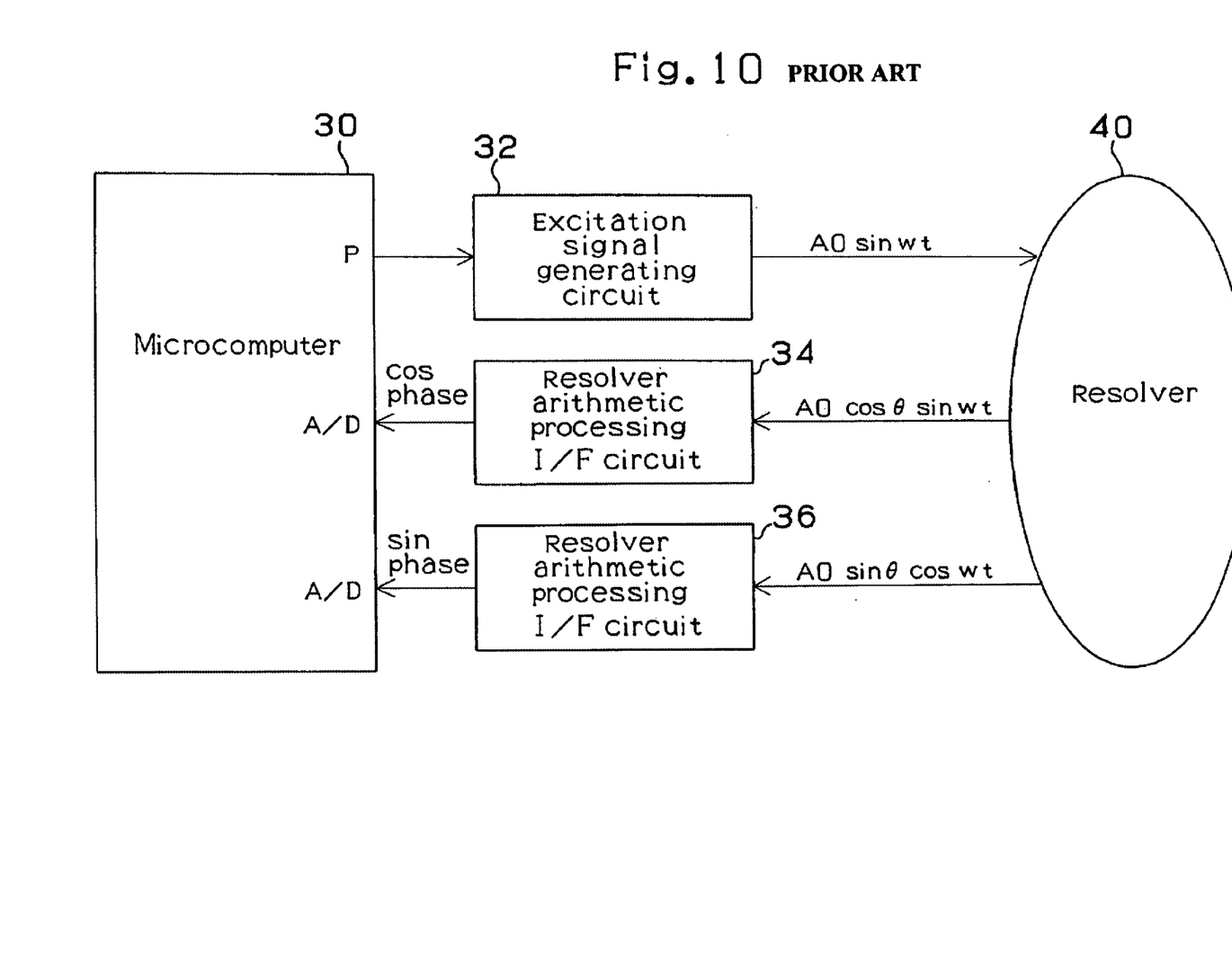
FIG. 10 is a block diagram showing the structure of a conventional resolver type position detector.

The electrically-powered steering apparatus, which is an important vehicle component, is demanded to have a high reliability. For the reason, public attention has been paid to a resolver-type position detector having a high mechanical reliability for detecting a steering torque of the electrically-powered steering apparatus and the motor position. As shown in FIG. 10, the resolver-type position detector comprises a resolver 40, an excitation signal generating circuit 32 for supplying an excitation signal of $A_0 \theta \sin \omega t$ to the resolver 40, a resolver arithmetic processing I/F circuit 34 for amplifying cos phase signal ($A_0 \cos \theta \sin \omega t$) acquired from the resolver 40, a resolver arithmetic processing I/F circuit 36 for amplifying sin phase signal ($A_0 \sin \theta \cos \omega t$) acquired from the resolver 40 and a microcomputer 30 for computing a position from the sin phase and cos phase outputs of the resolver arithmetic processing I/F circuit 34 and the resolver arithmetic processing I/F circuit 36.

Figure 4:
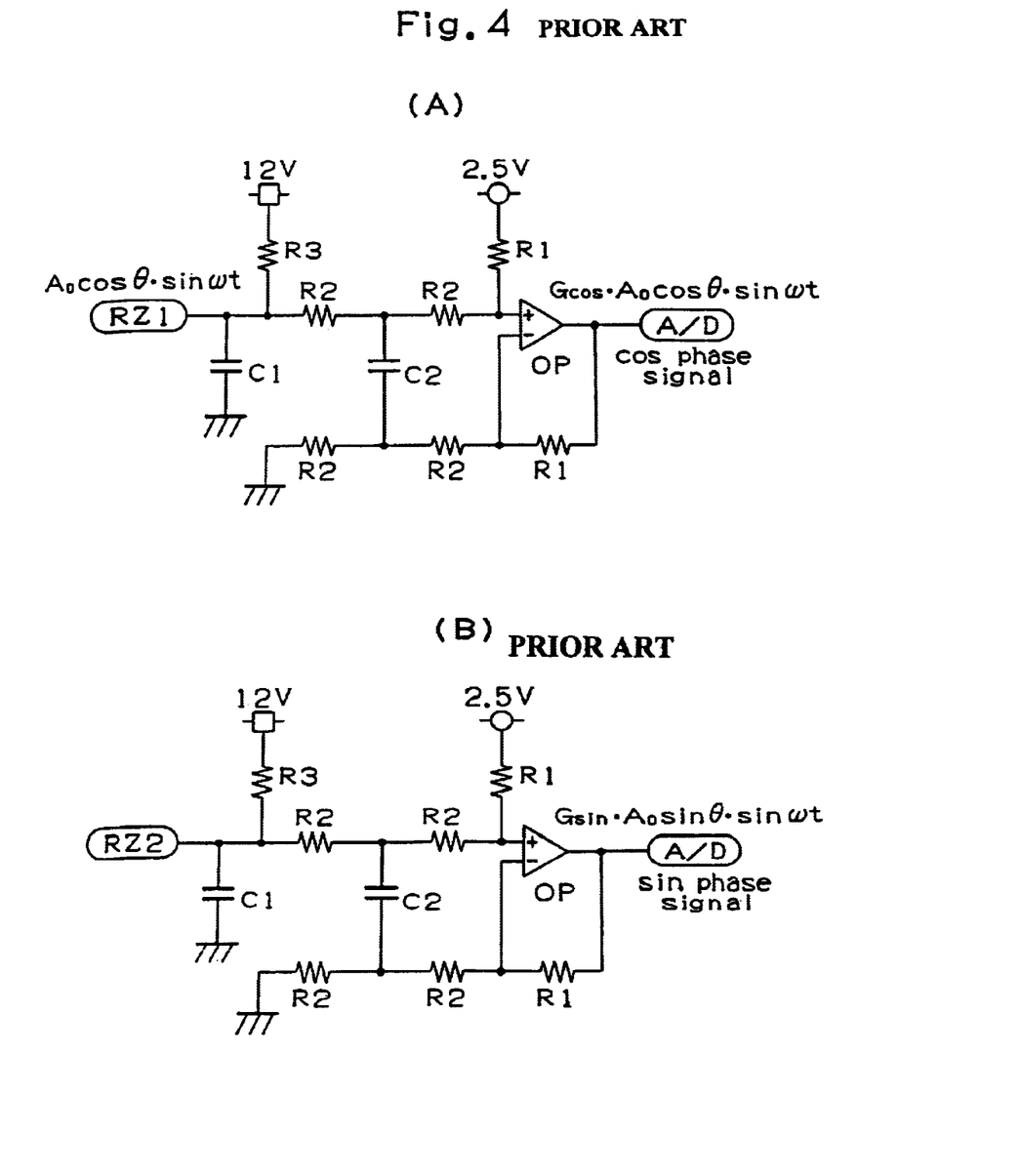

The structures of the resolver arithmetic processing I/F circuit 34 for amplifying the cos phase signal ($A_0 \cos \theta \sin \omega t$) acquired from this resolver 40 and the resolver arithmetic processing I/F circuit 36 for amplifying the sin phase signal ($A_0 \sin \theta \cos \omega t$) will be described with reference to FIG. 4. FIG. 4(A) shows the structure of the resolver arithmetic processing I/F circuit 34 and FIG. 4(B) shows the structure of the resolver arithmetic processing I/F circuit 36. The amplification factors of the resolver arithmetic processing I/F circuit 34 for amplifying the cos phase signal ($A_0 \cos \theta \sin \omega t$) and the resolver arithmetic processing I/F circuit 36 for amplifying the sin phase signal ($A_0 \sin \theta \cos \omega t$) are both R1/R2.

Here, if there is no deviation in resistance of each of the resolver arithmetic processing I/F circuit 34 and the resolver arithmetic processing I/F circuit 36, the amplification factors of the resolver arithmetic processing I/F circuit 34 and the resolver arithmetic processing I/F circuit 36 are equalized. However, actually there is produced a difference in the amplification factor depending on an error of resistance. If the position is computed from the sin phase and cos phase outputs based on this difference in the amplification factor by the microcomputer 30, an error of angle is generated.

Therefore, if the resolver-type position detector shown in FIG. 10 is employed as a motor angle sensor for the electrically-powered steering apparatus to control a brushless motor for assisting the steering of vehicle wheels, a torque ripple occurs so that steering feeling is lost. Further, if the resolver-type position detector is employed as a torque sensor for detecting a steering torque, a proper steering torque cannot be detected, so that the steering feeling is lost.

SUMMARY OF THE INVENTION

The present invention has been accomplished to solve the above-described problems and therefore, an object of the present invention is to provide a correction method of a position detector capable of detecting a position using a resolver accurately and an electrically-powered steering apparatus capable of assisting for a steering torque appropriately using the resolver.

In order to achieve the above object, a correction method of a position detector according to the present invention comprising: a resolver; a resolver excitation circuit for supplying an excitation signal to the resolver; a cos phase interface circuit for amplifying a cos phase signal obtained from the resolver; a sin phase interface circuit for amplifying a sin phase signal obtained from the resolver; and an arithmetic processing circuit for computing a position from outputs of the cos phase interface circuit and the sin phase interface circuit, said correction method comprising:

supplying a reference signal to said cos phase interface circuit and said sin phase interface circuit;

obtaining a differential in amplification factor between said cos phase interface circuit and said sin phase interface circuit from the outputs of said cos phase interface circuit and said sin phase interface circuit when said reference signal is supplied; and when said arithmetic processing circuit computes a position from the outputs of the cos phase interface circuit and the sin phase interface circuit, correcting the position with reference to the obtained differential.

According to the correction method of the position detector of the present invention, a reference signal is supplied to the cos phase interface circuit and the sin phase interface circuit, a differential in amplification factor between the cos phase interface circuit and the sin phase interface circuit is obtained from the outputs of the cos phase interface circuit and the sin phase interface circuit when the reference signal is supplied and when a position is computed from the outputs of the cos phase interface circuit and the sin phase interface circuit, the position is corrected with reference to the obtained differential. Consequently, even if there is a differential in the amplification factor between the cos phase interface circuit and the sin phase interface circuit, the position can be detected accurately by correcting the differential.

An electrically-powered steering apparatus for assisting steering of vehicle wheels by means of a motor based on a position signal from the position detector, having a position detector comprising: a resolver; a resolver excitation circuit for supplying an excitation signal to the resolver; a cos phase interface circuit for amplifying a cos phase signal obtained from the resolver; a sin phase interface circuit for amplifying a sin phase signal obtained from the resolver; and an arithmetic processing circuit for computing a position from outputs of the cos phase interface circuit and the sin phase interface circuit, comprising:

supplies a reference signal to said cos phase interface circuit and said sin phase interface circuit;

obtains a differential in amplification factor between said cos phase interface circuit and said sin phase interface circuit from the outputs of said cos phase interface circuit and said sin phase interface circuit when said reference signal is supplied; and corrects the computation of a position by said arithmetic processing circuit based on the outputs of the cos phase interface circuit and the sin phase interface circuit with reference to the obtained differential, the steering assistance by the motor being prohibited while said position detector is searching for the differential in the amplification factor between the cos phase interface circuit and the sin phase interface circuit.

In the electrically-powered steering apparatus of the present invention, the position detector supplies a reference signal to the cos phase interface circuit and the sin phase interface circuit, obtains a differential in amplification factor between the cos phase interface circuit and the sin phase interface circuit from the outputs of the cos phase interface circuit and the sin phase interface circuit when the reference signal is supplied, and corrects the computation of a position based on the outputs of the cos phase interface circuit and the sin phase interface circuit with reference to the obtained differential. Thus, even if there is a differential in amplification factor between the cos phase interface circuit and the sin phase interface circuit, the position can be detected accurately by correcting the differential. For the reason, the electrically-powered steering apparatus can assist the steering torque appropriately using the resolver. Further, because the steering assistance by a motor is prohibited while the position detector is searching for the differential in the amplification factor between the cos phase interface circuit and the sin phase interface circuit, inappropriate assistance by the motor can be prevented.

BRIEF DESCRIPTION OF THE DRAWINGS

FIG. 4(A) is a diagram showing the structure of the resolver arithmetic processing I/F circuit for amplifying the cos phase signal ($A_0 \cos \theta \sin \omega t$) while FIG. 4(B) is a diagram showing the structure of the resolver arithmetic processing I/F circuit for amplifying the sin phase signal ($A_0 \sin \theta \cos \omega t$);

DESCRIPTION OF THE PREFERRED EMBODIMENTS

Hereinafter, the preferred embodiments of the electrically-powered steering apparatus of the present invention will be described with reference to the accompanying drawings. In following embodiments, an example in which the electrically-powered steering apparatus of the present invention is applied to an electrically-powered steering apparatus of vehicle will be described.

First, the main structure of the electrically-powered steering apparatus 10 of the first embodiment will be described with reference to FIG. 1.

Figure 1:
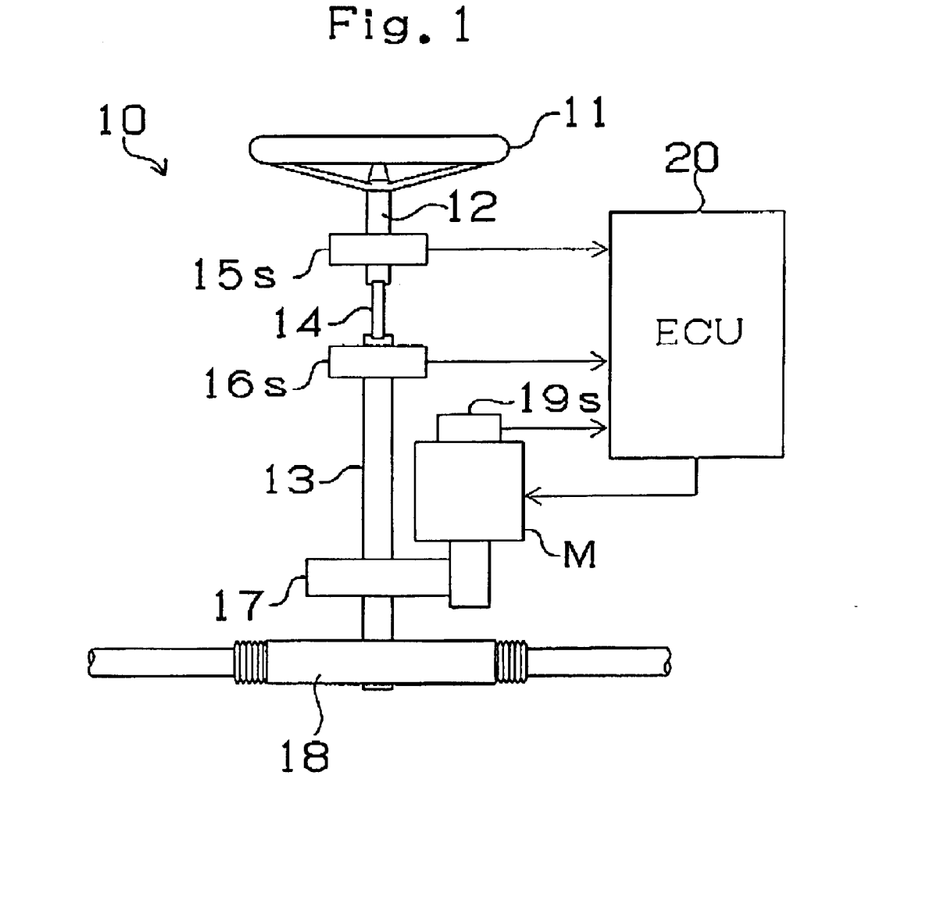
FIG. 1 is a block diagram showing the main structure of the electrically-powered steering apparatus according to a first embodiment of the present invention.

As shown in FIG. 1, the electrically-powered steering apparatus 10 comprises mainly a steering wheel 11, a steering shaft 12, a pinion shaft 13, a torsion bar 14, first and second angle sensors 15s, 16s, a reduction gear 17, a rack pinion 18, a motor rotation angle sensor 19s, a motor M, an ECU 20 and the like. Steering condition by the steering wheel 11 is detected and an assist force corresponding to that steering condition is generated by a motor M so as to assist steering.

That is, an end of the steering shaft 12 is connected to the steering wheel 11 while an end of the torsion bar 14 is connected to the other end of the steering shaft 12. Further, an end of the pinion shaft 13 is connected to the other end of the torsion bar 14 while the pinion gear of the rack pinion 18 is connected to the other end of this pinion shaft 13. The steering shaft 12 and the pinion shaft 13 are provided with angle sensors 15s, 16s capable of detecting respective rotation angles (steering angles $\theta 1$, $\theta 2$) absolutely, these angles sensors being connected electrically to the ECU 20. As the first and second angle sensors 15s, 16s, resolver-type absolute angle sensors are employed.

Consequently, the steering shaft 12 and the pinion shaft 13 can be connected through the torsion bar 14 so that they can be rotated relatively to each other. The rotation angle (steering angle $\theta 1$) of the steering shaft 12 and the rotation angle (steering angle $\theta 2$) of the pinion shaft 13 can be detected by the angle sensors 15s, 16s respectively. Thus, the rotation angle of the steering shaft 12 can be detected by the angle sensor 15s as the steering angle $\theta 1$. Further, the torsion amount (corresponding to steering torque) of the torsion bar 14 can be detected from a difference in angle (differential) between the steering angle $\theta 1$ of the steering shaft 12 by the angle sensor 15s and the steering angle $\theta 2$ of the pinion shaft 13 by the angle sensor 16s, an angle ratio or the like, as a torsion angle.

The reduction gear 17 for transmitting a driving force generated by the motor M at a predetermined reduction ratio is meshed with the halfway of the pinion shaft 13 through a gear (not shown), so that the driving force of the motor M or the assist force is transmitted to the pinion shaft 13 by the reduction gear 17. Further, this motor M is provided with the motor rotation angle sensor 19s capable of detecting its rotation angle and the motor rotation angle sensor 19s is also connected electrically to the ECU 20. The resolver-type absolute angle sensor is employed as this motor rotation angle sensor 19s.

Because the rotation angle signals detected by the first and second angle sensors 15s, 16s and the motor rotation angle sensor 19 can be transmitted to the ECU 20, the ECU 20 can determine an assist force to be generated by the motor M based on each rotation angle signal as described later. Wheels (not shown) are coupled to both sides of the rack pinion 18 through a tie-rod or the like.

Next, the electrical structure and the action of the ECU 20 and the like which constitute the electrically-powered steering apparatus 10 will be described with reference to FIG. 2.

Figure 2:
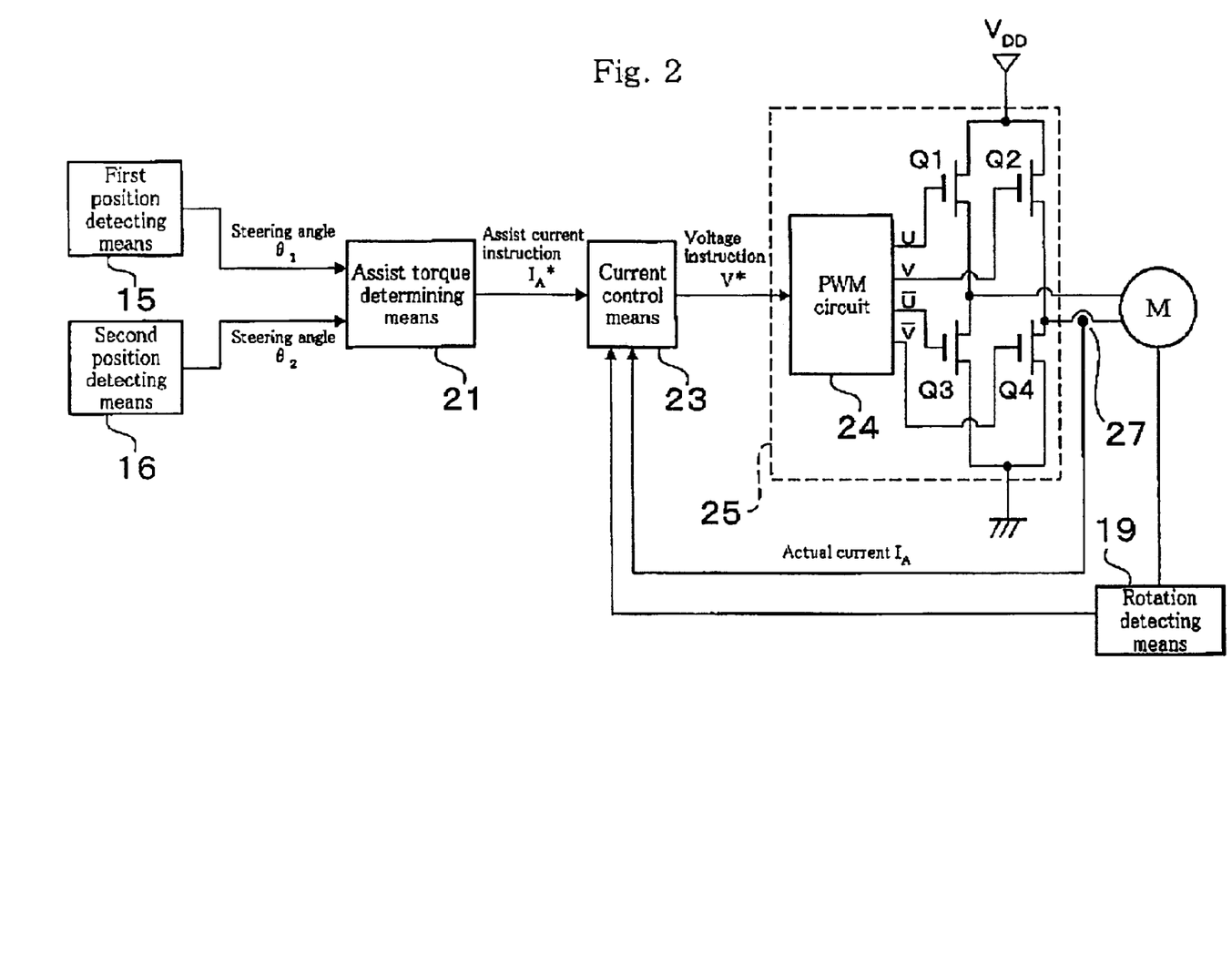
FIG. 2 is a block diagram showing the main electrical structure of the ECU and motor driving circuit shown in FIG. 1.

As shown in FIG. 2, the ECU 20 comprises mainly a first position detecting means 15, a second position detecting means 16, an assist torque determining means 21, a current control means 23, a rotation detecting means 19 and the like. More specifically, it is constituted of CPU (microcomputer), memory devices and various kinds of interface circuits and the like.

The first position detecting means 15 detects a steering angle $\theta 1$ based on the output of the first angle sensor 15s shown in FIG. 1. Likewise, the second position detecting means 16 detects a steering angle $\theta 2$ based on the output of the second angle sensor 16s. The assist torque determining means 21 determines an assist force to be generated by the motor M based on the steering angle θ1 detected by the first position detecting means 15 and the steering angle θ2 detected by the second position detecting means 16. An assist current instruction IA* is obtained according to a map of the assist current instruction IA* set preliminarily corresponding to, for example, a difference in angle between the steering angles θ1 and θ2, an angle ratio (differential) or the like, or predetermined arithmetic processing or the like.

The current control means 23 converts the assist current instruction IA* determined by the assist torque determining means 21 to a voltage based on actual current IA flowing through the motor M and the rotation of the motor M detected by a rotation detecting means 19 so as to output a voltage instruction V*. That is, the current control means 23 feeds back the actual current IA flowing through the motor M detected by the motor current detecting means 27 negatively so as to output an object voltage instruction V*.

A motor driving means 25 comprises a PWM circuit 24 and switching devices Q1–Q4. The PWM circuit 24 is a pulse width modulating circuit achieved by a hardware different from the ECU 20, which is capable of outputting pulse signals each having a pulse width corresponding to the voltage instruction V* outputted from the current control means 23 for each of phase U and phase V. Because the pulse signals of phase U and phase V corresponding to each gate of the switching devices Q1–Q4 connected to the output side can be provided, the motor M can be controlled arbitrarily by turning ON/OFF the switching devices Q1–Q4 corresponding to the pulse width.

The rotation detecting means 19 detects the rotation angle of the motor M based on the output from the motor rotation angle sensor 19s and outputs a feedback signal to the current control means 23.

Figure 3:
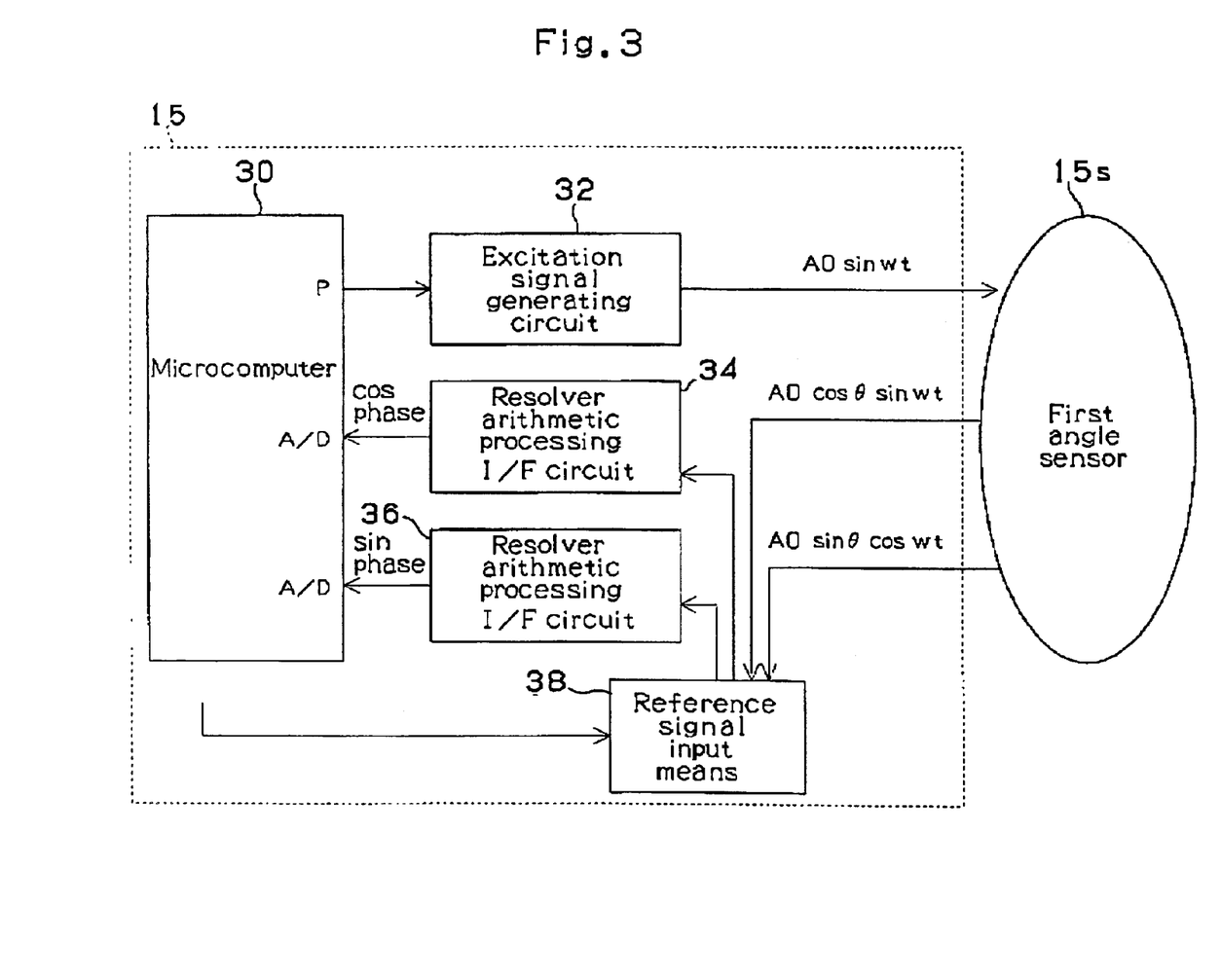
FIG. 3 is a block diagram showing the structure of the first position detecting means shown in FIG. 2.

Here, the structure of the first position detecting means 15 will be described with reference to FIG. 3. The first position detecting means 15 will be described as a representative here, while the second position detecting means 16 and the rotation detecting means 19 are constructed in the same way.

The first position detecting means 15 comprises an excitation signal generating circuit 32, which can constitute the resolver exciting circuit of the present invention for supplying an excitation signal of $A_0 \sin \omega t$ to the first angle sensor 15s, a resolver arithmetic processing I/F circuit (cos phase interface circuit) 34 for amplifying cos phase signal ($A_0 \cos \theta \sin \omega t$) obtained from the first angle sensor 15s, a resolver arithmetic processing I/F circuit 36 (sin phase interface circuit) for amplifying sin phase signal ($A_0 \sin \theta \cos \omega t$) obtained from the first angle sensor 15s, a reference signal input means 38 for outputting a reference signal for correction of the amplification factor to the resolver arithmetic processing I/F circuit 34 and the resolver arithmetic processing I/F circuit 36 and a microcomputer 30, which can constitute the arithmetic processing circuit of the present invention for computing a position from the sin phase and cos phase outputs from the resolver arithmetic processing I/F circuit 34 and the resolver arithmetic processing I/F circuit 36.

Here, the reference signal input means 38 is constituted of a multiplexer and always applies cos phase signal ($A_0 \cos \theta \sin \omega t$) and sin phase signal ($A_0 \sin \theta \cos \omega t$) from the first angle sensor 15 to the resolver arithmetic processing I/F circuit 34 and the resolver arithmetic processing I/F circuit 36. A reference signal outputted from the microcomputer 30 upon correction is applied to the resolver arithmetic processing I/F circuit 34 and the resolver arithmetic processing I/F circuit 36. Although the microcomputer 30 is provided with the assist torque determining means 21 and the current control means 23 in FIG. 2, a following description will be carried out with the microcomputer 30 provided for the first position detecting means for convenience of the description.

FIG. 4(A) shows the structure of the resolver arithmetic processing I/F circuit 34 for amplifying this cos phase signal ($A_0 \cos \theta \sin \omega t$) and FIG. 4(B) shows the structure of the resolver arithmetic processing I/F circuit 36 for amplifying the sin phase signal ($A_0 \sin \theta \cos \omega t$).

In the resolver arithmetic processing I/F circuit 34, the output from a detection coil RZ1 for detecting the cos phase of the first angle sensor (resolver) 15s is inputted to an noninverting input of an operational amplifier OP through a resistor R2 and a resistor R2. A grounded capacitor C1 and a constant voltage of 12 V through a resistor R3 are connected between a detection coil RZ1 and a resistor R2 on the side of the detection coil RZ1. On the other hand, a constant voltage of 2.5 V is connected through a resistor R1 between a resistor R2 on the side of the noninverting input of the operational amplifier OP and the noninverting input. The inverting input of the operational amplifier OP is grounded through a resistor R2 and a resistor R2. A capacitor C2 Is connected between the resistor R2 on the side of the noninverting input of the operational amplifier OP and the resistor R2 on the side of the inverting input. A resistor R1 is connected between the inverting input of the operational amplifier OP and the output thereof. In the resolver arithmetic processing I/F circuit 36 shown in FIG. 4(B), a similar circuit is connected to a detection coil RZ2 for detecting the sin phase of the first angle sensor (resolver) 15s.

The amplification factor G cos of the resolver arithmetic processing I/F circuit 34 for amplifying the cos phase signal ($A_0 \cos \theta \sin \omega t$) and the amplification factor G sin of the resolver arithmetic processing I/F circuit 36 for amplifying the sin phase signal ($A_0 \sin \theta \cos \omega t$) are both R1/R2 on design.

The microcomputer 30 estimates the angle of the first angle sensor 15s based on the cos phase signal (G cos $A_0 \cos \theta \sin \omega t$) of the first angle sensor 15s amplified by G cos (R1/R2) by the resolver arithmetic processing I/F circuit 34 and the sin phase signal (G sin $A_0 \sin \theta \cos \omega t$) of the first angle sensor 15s amplified by G sin(R1/R2) by the resolver arithmetic processing I/F circuit 36.

Figure 5:
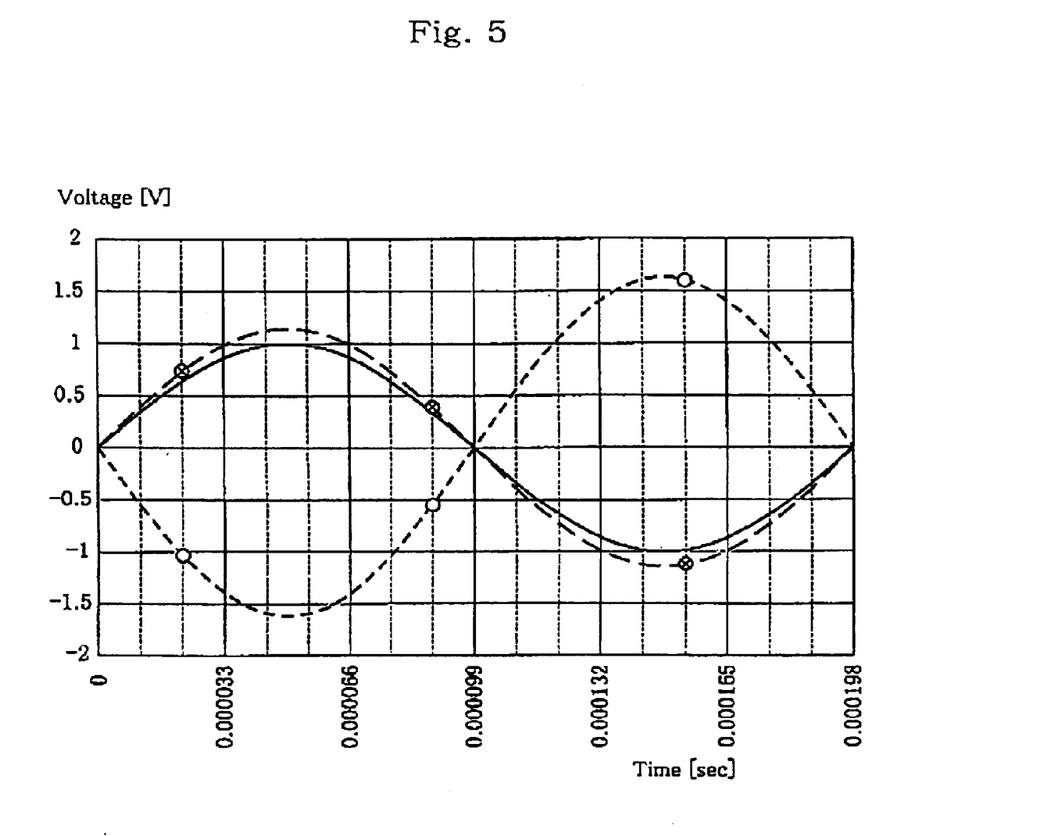
FIG. 5 is a graph showing a case where an excitation signal, sin phase signal and cos phase signal are sampled three times each when the angle (electrical angle $\theta$ of resolver) of a first sensor is 145 deg.

That is, the microcomputer 30 samples the sin phase and cos phase n times synchronously (its sampling cycle is shorter than excitation signal cycle. When n=3, the sampling cycle is fs=ω/2π×3). The sampling will be explained with reference to the graph of FIG. 5. With voltage and time indicated on the ordinate axis and abscissa axis respectively, FIG. 5 shows an excitation signal of a case where the angle (resolver electrical angle θ) of the first sensor 15s is 145 deg and a case where the sin phase signal and the cos phase signal are sampled three times. In FIG. 5, the solid line indicates the excitation signal, the long dash line indicates the sin phase signal and the short dash line indicates the cos phase signal. Sin phase sampling points are indicated by a "○" and Cos phase sampling points are indicated by a "x". According to the method of least squares, the amplitudes of the sin phase and cos phase are estimated as indicated in Expression 1 and Expression 2 and an angle is estimated from the ratio of the amplitude between the sin phase and the cos phase. Although according to this embodiment, the amplitudes of the sin phase and cos phase are estimated from a sampled value, it is permissible to obtain an amplitude by holding the peak of the sin phase signal and cos phase signal instead.

[Expression 1]

$$G_{cos} \times A_0 \cos\theta = \frac{\sum_{i=1}^{n} X_i \times \sin\omega ti}{\sum_{i=1}^{n} \sin^2 \omega ti}$$

[Expression 2]

$$G_{sin} \times A_0 \sin\theta = \frac{\sum_{i=1}^{n} Y_i \times \sin\omega ti}{\sum_{i=1}^{n} \sin^2 \omega ti}$$

where $A_0$: amplitude of excitation signal
$X_i$: A/D value of cos phase sampled at time ti
$Y_i$: A/D value of sin phase sampled at time ti When the amplification factor G cos of the resolver arithmetic processing I/F circuit 34 for amplifying the cos phase signal ($A_0 \cos\theta \sin\omega t$) and the amplification factor G sin of the resolver arithmetic processing I/F circuit 36 for amplifying the sin phase signal ($A_0 \sin\theta \cos\omega t$) are equalized on R1/R2, the microcomputer 30 acquires the ratio between the above expression 1 and expression 2 to obtain tan $\theta$ and then retrieves a held map so as to obtain an angle $\theta$ of the first sensor 15s.

In the above description, it is assumed that the amplification factor G cos of the resolver arithmetic processing I/F circuit 34 for amplifying the cos phase signal ($A_0 \cos\theta \sin\omega t$) and the amplification factor G sin of the resolver arithmetic processing I/F circuit 36 for amplifying the sin phase signal ($A_0 \sin\theta \cos\omega t$) are equal R1/R2 on design. However, in the circuit described above with reference to FIG. 4, there is a difference between the amplification factor G cos of the resolver arithmetic processing I/F circuit 34 and the amplification factor G sin of the resolver arithmetic processing I/F circuit 36, resulting from a difference of resistance value. Unless this difference is taken into account, an error in angle is generated.

Figure 6:
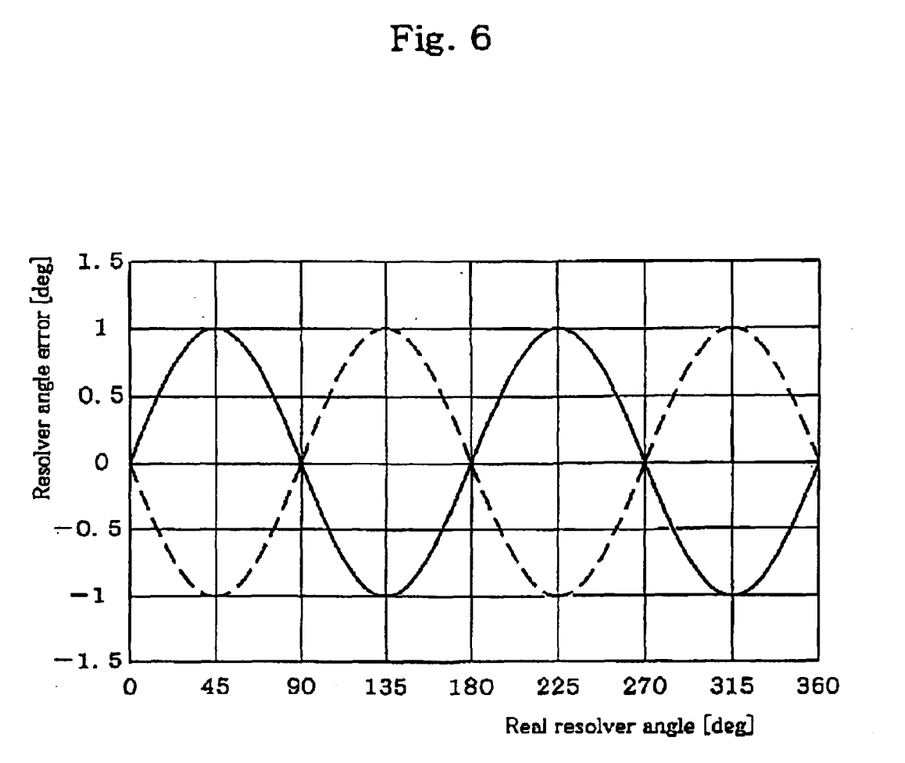
FIG. 6 is a graph showing an error in angle of the resolver.

This angle error will be explained with reference to FIG. 6 in which the solid line indicates a G cos/G sin of 1.0355 and the dash line indicates a G cos/G sin of 0.9657. With the angle error [deg] of the first angle sensor (resolver) 15s and a real angle [deg] of the first angle sensor (resolver) 15s indicated on the ordinate axis and the abscissa axis, respectively, FIG. 6 shows cases where the ratio between the amplification factor G cos of the resolver arithmetic processing I/F circuit 34 and the amplification factor G sin of the resolver arithmetic processing I/F circuit 36 is 1.0355 and 0.9657. This graph indicates that angle errors of two cycles appear every turn of the resolver electrical angle. In the meantime, the signs of the resolver angle error are opposite when the ratio is larger than 1 (1.0355) and smaller than 1 (0.9657).

The electrically-powered steering apparatus of this embodiment eliminates the detection error of the position detecting means by correcting the errors of the amplification factor G cos of the resolver arithmetic processing I/F circuit 34 and the amplification factor G sin of the resolver arithmetic processing I/F circuit 36. That is, upon correction, the reference signal outputted from the microcomputer 30 is applied to the resolver arithmetic processing I/F circuit 34 and the resolver arithmetic processing I/F circuit 36 through the reference signal input means 38. The microcomputer 30 obtains a differential from the outputs of the resolver arithmetic processing I/F circuit 34 and the resolver arithmetic processing I/F circuit 36 when this reference signal is supplied and then, obtains a correction value for a time when a position is computed with this differential from the outputs of the resolver arithmetic processing I/F circuit 34 and the resolver arithmetic processing I/F circuit 36.

The processing for computing the correction value will be explained with reference to a flow chart of FIG. 7.

Figure 7:
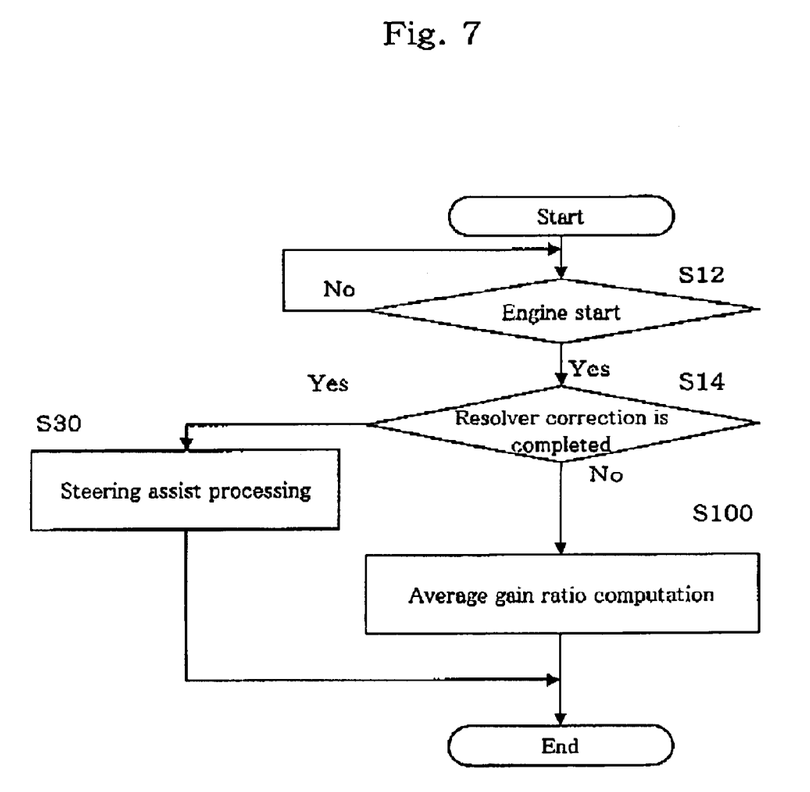
FIG. 7 is a flow chart of the processing for computing the steering assistance and average gain ratio with the ECU.

FIG. 7 is a flow chart of the processing for computing the steering assistance and average gain ratio with the ECU 20 shown in FIG. 1.

The ECU 20 determines whether or not an engine is started (S12). After the engine is started (S12: Yes), whether or not the processing for correcting an error between the amplification factor G cos of the resolver arithmetic processing I/F circuit 34 and the amplification factor G sin of the resolver arithmetic operation I/F circuit 36 is completed (S14). If the correction of the error is not completed (S14: No), the average gain ratio computing processing for obtaining an error between the amplification factor G cos of the resolver arithmetic processing I/F circuit 34 and the amplification factor G sin of the resolver arithmetic processing I/F circuit 36 with the first position detecting means 15, the second position detecting means 19 and the rotation detecting means 19 is carried out (S100). Then, if the average gain ratio computing processing is terminated (S14: Yes), the above-described steering assistance processing is started with reference to FIG. 2 (S30).

According to this embodiment, after the average gain ratio computing processing for obtaining the error between the amplification factor G cos of the resolver arithmetic processing I/F circuit 34 and the amplification factor G sin of the resolver arithmetic processing I/F circuit 36 is carried out at first upon starting an engine, the steering assistance processing is started. That is, the steering assistance processing is prohibited until the error correction is completed. Thus, steering assistance based on an inappropriate detection value is eliminated. Although the detection by the first position detecting means 15, the second position detecting means 19 and the rotation detecting means 19 is disabled during the average gain ratio computing processing, the inappropriate steering assistance is eliminated because the steering assistance is prohibited until the correction is completed.

Figure 8:
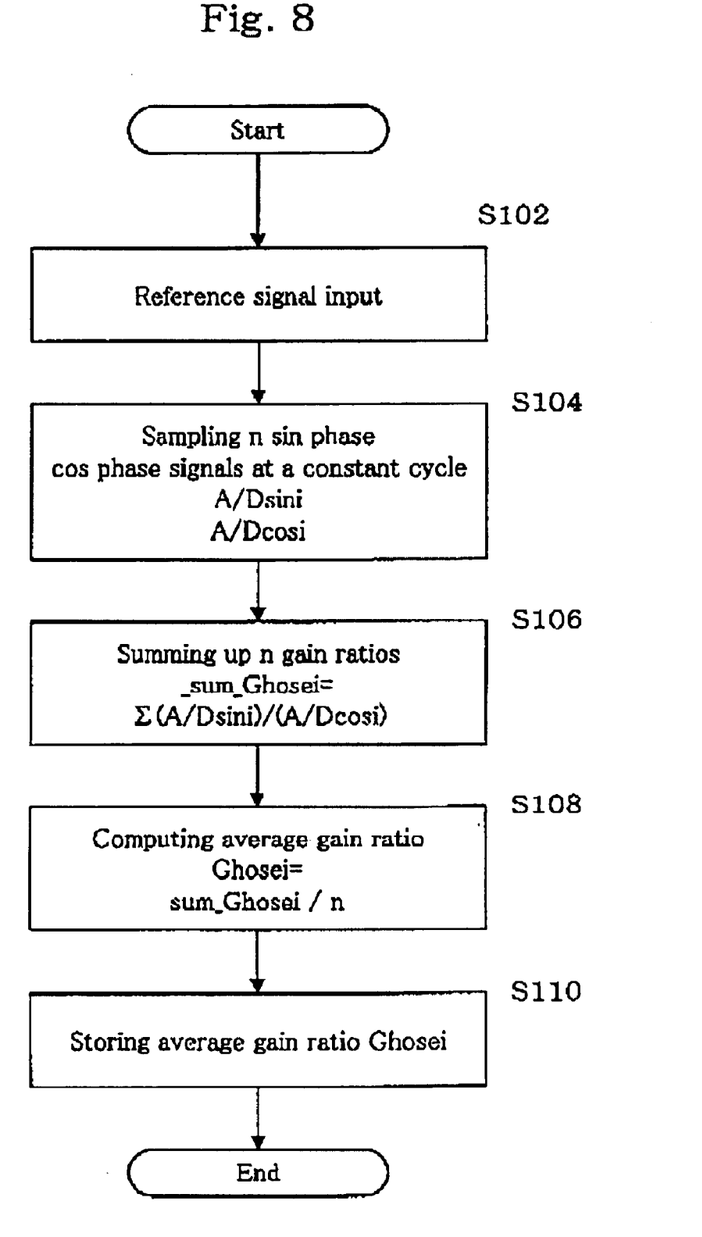
FIG. 8 is a flow chart showing the flow of the processing for computing the average gain ratio of FIG. 7.

Then, the average gain ratio computing processing for obtaining the error between the amplification factor G cos of the resolver arithmetic processing I/F circuit 34 and the amplification factor G sin of the resolver arithmetic processing I/F circuit 36 in S100 will be explained with reference to a flow chart of FIG. 8 showing a subroutine of that processing and the block diagram of FIG. 2.

This processing is carried out by the microcomputer 30 of each of the first position detecting means 15, the second position detecting means 19 and the rotation detecting means 19 based on an average gain ratio computing processing from the ECU 20.

First, the microcomputer 30 inputs a same level reference signal to the resolver arithmetic processing I/F circuit 34 and the resolver arithmetic processing I/F circuit 36 through the reference signal input means 38 (S102). The microcomputer 30 obtains A/D sin i and A/D cos i by sampling n (three in this case) signals of each of sin phase and cos phase at a constant cycle with reference to FIG. 5, as described above (S104). Here, the A/D indicates a value subjected to A/D conversion and i indicates a value sampled at time ti.

The sum of n gain ratios is computed according to a following expression (S106).

_sum_Ghosei=Σ(A/D sin i)(A/D cos i)

The average gain ratio is computed according to a following expression (S108).

Ghosei=sum_Ghose i/n

Then, a computed average gain ratio Ghosei is stored in a memory and the processing is terminated (S110).

Figure 9:
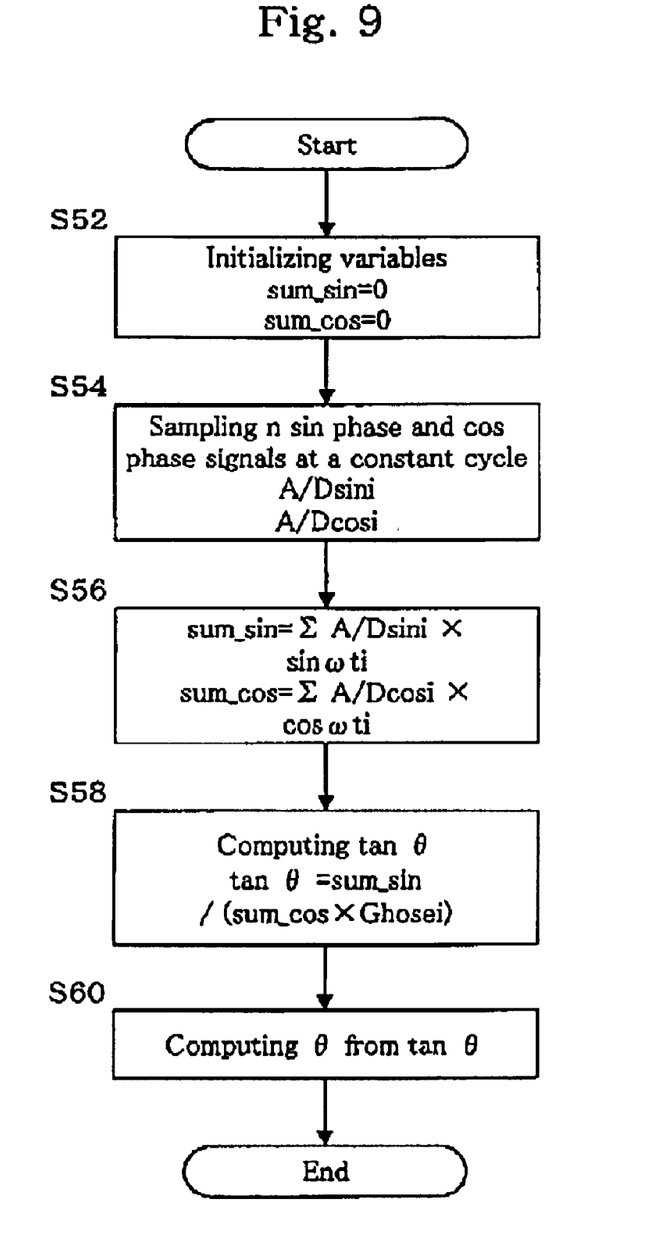
FIG. 9 is a flow chart showing the flow of position detection processing with a position detecting means.

A processing for the position detection by the microcomputer 30 shown in FIG. 2 in the steering assistance processing (S30) described above with reference to FIG. 7 will be described based on a flow chart of FIG. 9.

The microcomputer 30 initializes variables as follows (S52).

sum_sin=0 sum_cos=0

The microcomputer 30 obtains A/D sin i and A/D cos i by sampling n (three in this case) signals of sin phase and cos phase at a constant cycle with reference to FIG. 5 as described above (S54). Here, the A/D indicates a value subjected to A/D conversion and i indicates a value sampled at time ti.

The sum values of sin phase and cos phase are obtained as shown in a following expression (S56). The following expression is equal to a case where the denominator of the right side of the above-described operation executed with reference to Expressions 1 and 2 is set to 1. That is, upon this arithmetic operation, the denominator of the right side is neglected because of the same value, in order to obtain a ratio between Expressions 1 and 2.

sum_sin=ΣA/D sin i×sin ωti sum_cos=ΣA/D cos i×cos ωti

Tan θ (sin/cos) is computed according to a following expression (S58). Upon this computation, the difference in amplification factor of the reference signal between the resolver arithmetic operation I/F circuit 34 and the resolver arithmetic operation I/F circuit 36 is corrected by multiplying the denominator with an average gain ratio obtained in the above S100.

tan θ=sum_sin/(sum_cos×Ghosei)

The held map is retrieved according to the computed tan θ and an angle θ of the first angle sensor 15s is computed (S60).

The ECU 20 carries out the steering assistance processing based on detection values from the first position detecting means 15, the second position detecting means 19 and the rotation detecting means 19 with reference to FIGS. 1, 2.

According to this embodiment, even if the steering assistance is executed by controlling the motor M using the resolver type position detector having a high mechanical reliability as a motor angle sensor (rotation detecting means), no torque ripple is generated, so that steering feeling is not lost. Further, because a proper steering torque can be detected by using the resolver type position detector as a torque sensor (first position detecting means, second position detecting means) for detecting the steering force (steering torque), the steering feeling is not lost.

According to the above described embodiment, although the correction of difference in the amplification factor between the resolver arithmetic processing I/F circuit 34 and the resolver arithmetic processing I/F circuit 36 is executed every time when the engine is started, this may be carried out once upon shipment of a vehicle from plant. In this case, the reference signal may be applied directly to the resolver arithmetic processing I/F circuit 34 an the resolver arithmetic processing I/F circuit 36 from a circuit tester without using the reference signal input means shown in FIG. 3.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A correction method of a position detector comprising: a resolver; a resolver excitation circuit for supplying an excitation signal to the resolver; a cos phase interface circuit for amplifying a cos phase signal obtained from the resolver; a sin phase interface circuit for amplifying a sin phase signal obtained from the resolver; and an arithmetic processing circuit for computing a position from outputs of the cos phase interface circuit and the sin phase interface circuit, said correction method comprising:

supplying a reference signal to said cos phase interface circuit and said sin phase interface circuit;

obtaining a differential in amplification factor between said cos phase interface circuit and said sin phase interface circuit from the outputs of said cos phase interface circuit and said sin phase interface circuit when said reference signal is supplied; and when said arithmetic processing circuit computes a position from the outputs of the cos phase interface circuit and the sin phase interface circuit, correcting the position with reference to the obtained differential.

2. An electrically-powered steering apparatus for assisting steering of vehicle wheels by means of a motor based on a position signal from the position detector comprising: a resolver; a resolver excitation circuit for supplying an excitation signal to the resolver; a cos phase interface circuit for amplifying a cos phase signal obtained from the resolver; a sin phase interface circuit for amplifying a sin phase signal obtained from the resolver; and an arithmetic processing circuit for computing a position from outputs of the cos phase interface circuit and the sin phase interface circuit, wherein said arithmetic processing circuit:

supplies a reference signal to said cos phase interface circuit and said sin phase interface circuit;

obtains a differential in amplification factor between said cos phase interface circuit and said sin phase interface circuit from the outputs of said cos phase interface circuit and said sin phase interface circuit when said reference signal is supplied; and corrects the computation of a position by said arithmetic processing circuit based on the outputs of the cos phase interface circuit and the sin phase interface circuit with reference to the obtained differential, the steering assistance by the motor being prohibited while said position detector is searching for the differential in the amplification factor between the cos phase interface circuit and the sin phase interface circuit.

3. An electrically-powered steering apparatus for assisting steering of vehicle wheels by means of a motor based on a position signal from the position detector, having a position detector comprising: a resolver; a resolver excitation circuit for supplying an excitation signal to the resolver; a cos phase interface circuit for amplifying a cos phase signal obtained from the resolver; a sin phase interface circuit for amplifying a sin phase signal obtained from the resolver; and an arithmetic processing circuit for computing a position from outputs of the cos phase interface circuit and the sin phase interface circuit, said arithmetic processing circuit comprising:

means for supplying a reference signal to said cos phase interface circuit and said sin phase interface circuit;

means for obtaining a differential in amplification factor between said cos phase interface circuit and said sin phase interface circuit from the outputs of said cos phase interface circuit and said sin phase interface circuit when said reference signal is supplied;

means for correcting the computation of a position by said arithmetic processing circuit based on the outputs of the cos phase interface circuit and the sin phase interface circuit with reference to the obtained differential; and means for prohibiting steering assistance by the motor while said position detector is searching for the differential in the amplification factor between the cos phase interface circuit and the sin phase interface circuit.

4. The electrically powered steering apparatus for assisting steering of vehicle wheels according to claim 3, wherein said correction of the computation of the position is executed when an engine is started.

5. The electrically powered steering apparatus for assisting steering of vehicle wheels according to claim 3, wherein said correction of the computation of the position is executed upon shipment of the vehicle from a manufacturing plant thereof.

* * * * *